(12) United States Patent
Wilson

(10) Patent No.: US 7,359,530 B2
(45) Date of Patent: Apr. 15, 2008

(54) OBJECT-BASED RASTER TRAPPING

(75) Inventor: Jonathan Robert Wilson, Cambridge (GB)

(73) Assignee: Global Graphics Software Limited, Cambridge (GB)

( * ) Notice: Subject to any disclaimer, the term of this patent is extended or adjusted under 35 U.S.C. 154(b) by 706 days.

(21) Appl. No.: 10/861,242

(22) Filed: Jun. 4, 2004

(65) Prior Publication Data

US 2005/0012946 A1 Jan. 20, 2005

Related U.S. Application Data

(60) Provisional application No. 60/476,410, filed on Jun. 6, 2003.

(51) Int. Cl.
*G06K 9/00* (2006.01)
(52) U.S. Cl. ........................ 382/103; 382/167; 358/518
(58) Field of Classification Search ................ 382/106, 382/112, 113, 168, 135–140, 173, 176, 178, 382/181–189, 254, 274, 316–321, 103, 162–167, 382/199, 201, 203, 209, 221, 291, 292; 345/620; 358/1.9, 518, 1.15; 347/251
See application file for complete search history.

(56) References Cited

U.S. PATENT DOCUMENTS 6,031,544 A * 2/2000 Yhann ........................ 345/620
6,239,829 B1 * 5/2001 Curry ......................... 347/251
6,327,043 B1 * 12/2001 Rumph et al. .............. 358/1.15
7,009,735 B2 * 3/2006 Ebner ......................... 358/1.9
7,046,403 B1 * 5/2006 Yhann ........................ 358/518
7,088,469 B1 * 8/2006 Sanger et al. ................. 358/1.9
7,116,821 B2 * 10/2006 Lane et al. .................. 382/178
7,123,381 B2 * 10/2006 Klassen ...................... 358/1.9
7,196,816 B2 * 3/2007 Watanabe .................... 358/1.9

OTHER PUBLICATIONS

PostScript Language Reference Manual, Adobe Systems Incorporated—3$^{rd}$ Edition, Feb. 1999, 6.3 In-RIP Trapping, pp. 439-454.*

"*PostScript Language Reference Manual*", Adobe Systems Incorporated—3$^{rd}$ Edition, Feb. 1999, §6.3 In-RIP Trapping, pp. 439-454.

* cited by examiner

*Primary Examiner*—Seyed Azarian
(74) *Attorney, Agent, or Firm*—Darby & Darby P.C.; Bruce E. Black

(57) ABSTRACT

Trapping graphics during pre-press workflow involves intensive computation. In this invention, the trapping engine uses simple bounding boxes, colors, and temporal order information, to eliminate the possibility of trapping many pairs of objects without ever having to calculate their exact shapes. By considering the temporal order of the objects in a page, such a z-order display list, the trapping engine can quickly reject the possibility of trapping in areas where it is not necessary.

19 Claims, 9 Drawing Sheets

Trap Seed

Bottom Mask

Top Mask

Positive Mask

Negative Mask

Final Trap Shape

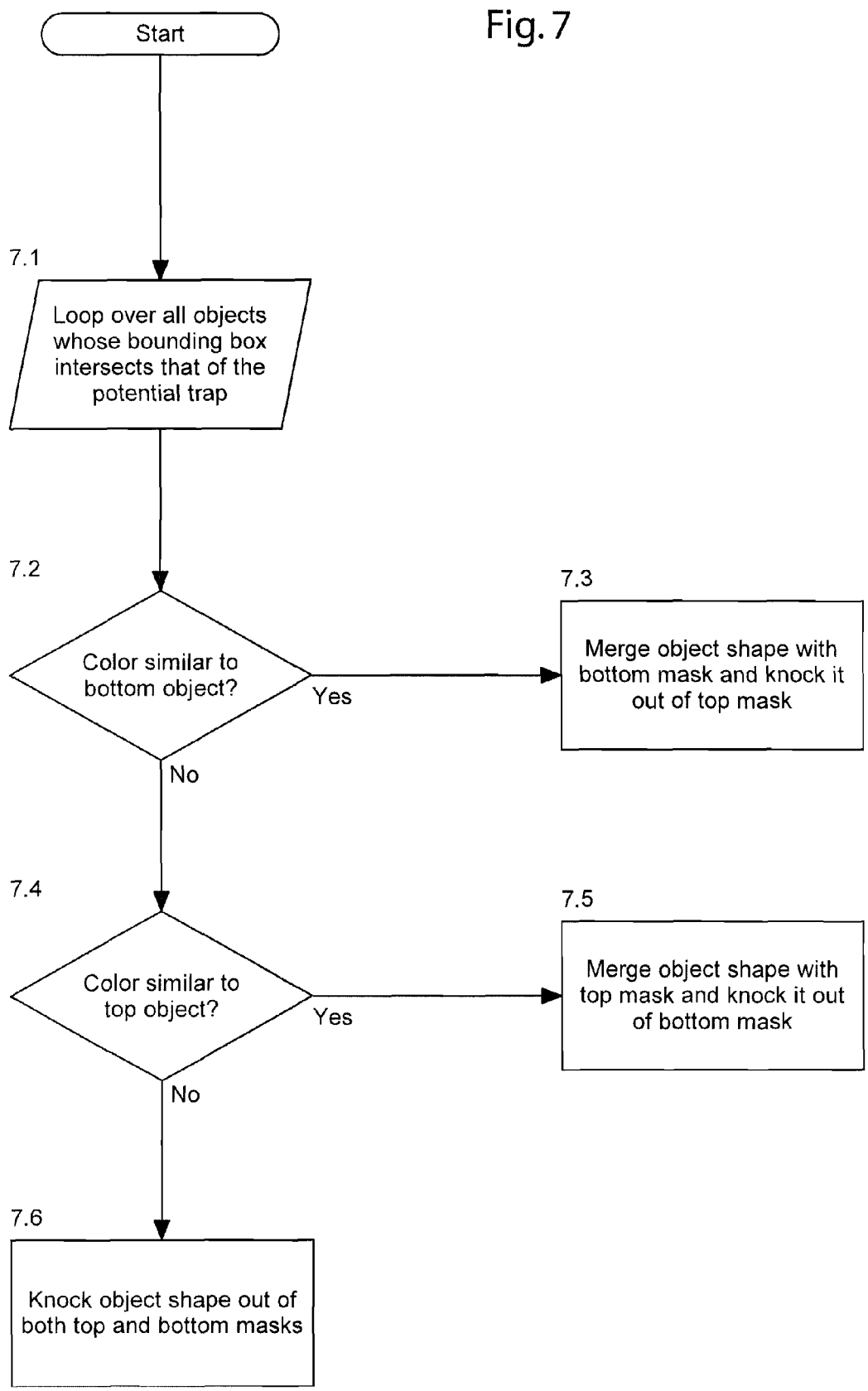

OBJECT-BASED RASTER TRAPPING

This application claims the benefit of U.S. Provisional Patent Application Ser. No. 60/476,410, filed Jun. 6, 2003, which is hereby incorporated by reference in its entirety.

FIELD OF THE INVENTION

This invention relates to the field of computer graphics and more particularly pre-press workflows using trapping.

BACKGROUND OF THE INVENTION

Current pre-press workflow and desktop publishing use an electronic page description file to track the specifications of how the page should be appear when printed or displayed. The file is a digital representation of the page to be printed. To print or display the page, it is translated into a scheme of pixels by a process called rasterization. The pixels correlate to locations on the page and represent black and white, shades of gray, or colors that make up the page. The output device, such as printer or monitor, can render the page according to the pixels. Some pre-printing processes use a display list which is an intermediary file between the page description file and the rasterized form. The elements of the page are identified as objects (text, shapes, etc.) and listed with respect to a Cartesian graph (x-axis, y-axis and z-axis). The z-order display list is a way of representing the painting model that indicates the temporal order of the objects, i.e., along the z-axis, as described in Section 4 of the PostScript Language Reference Manual, third edition, published by Adobe Systems Limited ("PostScript Manual").

Trapping is the process of modifying a page to be printed so as to allow for the possibility of misregistration between the multiple colored plates used in the printing process. Without trapping, a boundary or border between two objects which comprises two colors using different colorants (inks) could show a conspicuous white gap (light leak). Objects are elements on the page to be printed, such as a rectangle, fill, image, blend, text, etc. A trap is introduced at this boundary. The trap is a thin line positioned over the boundary in a color calculated such that the net result is that after the trap is applied, the two objects overlap. Thus, if misregistration occurs, within the limits of the size of the trap, the overlap prevents a white line appearing.

Many designers do not like the visual impact of trapping their designs. A good trapping solution will change the look of the page as little as possible in order to cover misregistration artifacts, while keeping the traps as unobtrusive as possible.

Trapping, when used, involves notoriously extensive computation. A typical page has areas of high color, such as illustrations (linework) or pictures (images), as well as less complex areas, often of black text on a white or plain background. Trapping is usually necessary on the high-color areas, and rarely on the simpler ones.

Existing trapping engine types include raster trappers, which typically act on an Run Length Encoded (RLE) representation of the whole page, and planarized vector trappers, where trapping is performed on a display list, but without z-order information, i.e., flattened. The raster trapper must consider each color transition at span boundaries for trapping, and the planarized vector trapper must do the same at every edge of its planarized vector map. Run Length Encoding is a commonly used representation of raster data where pixels on the same scan line which share a color value are stored as a series of spans. Spans comprise a run length (count of pixels) and a color value. The form of RLE typically used in raster trappers is flattened, that is, the spans abut each other exactly and are guaranteed not to overlap. The raster trapper must inspect the color values of each pair of neighboring spans, in both the x and y directions. A planarized vector map, on the other hand, is a representation of marks on a page which comprises a series of non-intersecting, tessellating, simple polygons, each with a distinct color.

What is needed is a way of trapping a page efficiently, and with the opportunity of introducing extra refinements in quality. This invention provides these and other features.

SUMMARY OF THE INVENTION

The present invention is an object-based raster trapper. A bounding box is identified for each object or group of objects on a page. The bounding box for a subject object and the bounding box for a background object relative to the subject object in temporal order are compared to determine whether the boxes intersect. If the boxes intersect, the subject object and the background object are compared to determine whether the objects intersect. If the objects intersect, a trap is formed based on a rendition of pixels for each of the subject object and the background object. The process is repeated for the next object that precedes the background object in temporal order, if there is not a complete trap for the subject object. The process is repeated for the next object that succeeds the subject object in the temporal order, if there is a complete trap for the subject object.

The trapping solution includes, but is not limited to, a unique way of handling the z-order display list (or other description of the page), masking, and generating feathered traps.

BRIEF DESCRIPTION OF THE DRAWINGS

The foregoing and other advantages and features of the invention will become more apparent from the detailed description of the preferred embodiment of the invention, given below with reference to the accompanying drawings in which:

FIG. 7 shows a flow chart for adjusting the trap according to the preferred embodiment of the invention.

DETAILED DESCRIPTION OF THE PREFERRED EMBODIMENT

In the preferred embodiment of the invention, a trapping engine uses simple bounding boxes, colors, and temporal order information, to eliminate the possibility of trapping many pairs of objects without ever having to calculate their exact shapes. By considering the temporal order of the objects in a page, such a z-order display list, the trapping engine can quickly reject the possibility of trapping in areas where it is not necessary. Once a pair of objects that may need trapping has been identified, the rasterizer of the host Raster Image Processor (RIP) is used to calculate the pixels (and pixel values) for these objects. The rendition of pixels, which may be in various forms such as RLE shapes, is then processed by the engine to generate the ideal trap shape.

The trapping engine has the advantage of being easy to integrate into an existing RIP implementation, since it uses much of the functionality which a RIP must already necessarily provide in order to rasterize a page. In this way, the development time of such a trapper is reduced, and its maintainability is good because the amount of new, trapping-specific code required is kept to a minimum. Also, the accuracy of the traps generated is guaranteed, since the pixels being trapped are identical to those that will be rasterized. Because the trapping process happens between interpretation of the page description and rasterization, integration and compatibility problems are kept to a minimum.

In the preferred embodiment, the primary input to the trapping engine is a temporal order display list, that is, a list that stores descriptions of every object on the page. The objects are indexed in temporal order, i.e., ordered with respect to the z-axis. For example, in FIG. 1, object 0 is the page itself, referred to as the erase-page object. The overlapping, intersecting squares are numbered from the background to the foreground as 2, 3 and 4, respectively. Object 6 is encompassed by (and on top of) object 5. Objects 8, 9, 10, 11, and 12 are positioned on a colored background object 7. The term trapping engine is used here to refer to the software application used to implement the invention in the preferred embodiment and operates cooperatively with the raster image processor (RIP).

The trapping engine performs a series of checks to establish that trapping is enabled and possible on the current page. If, for example, the page is monochrome, no further trapping effort is necessary.

Figure 1:
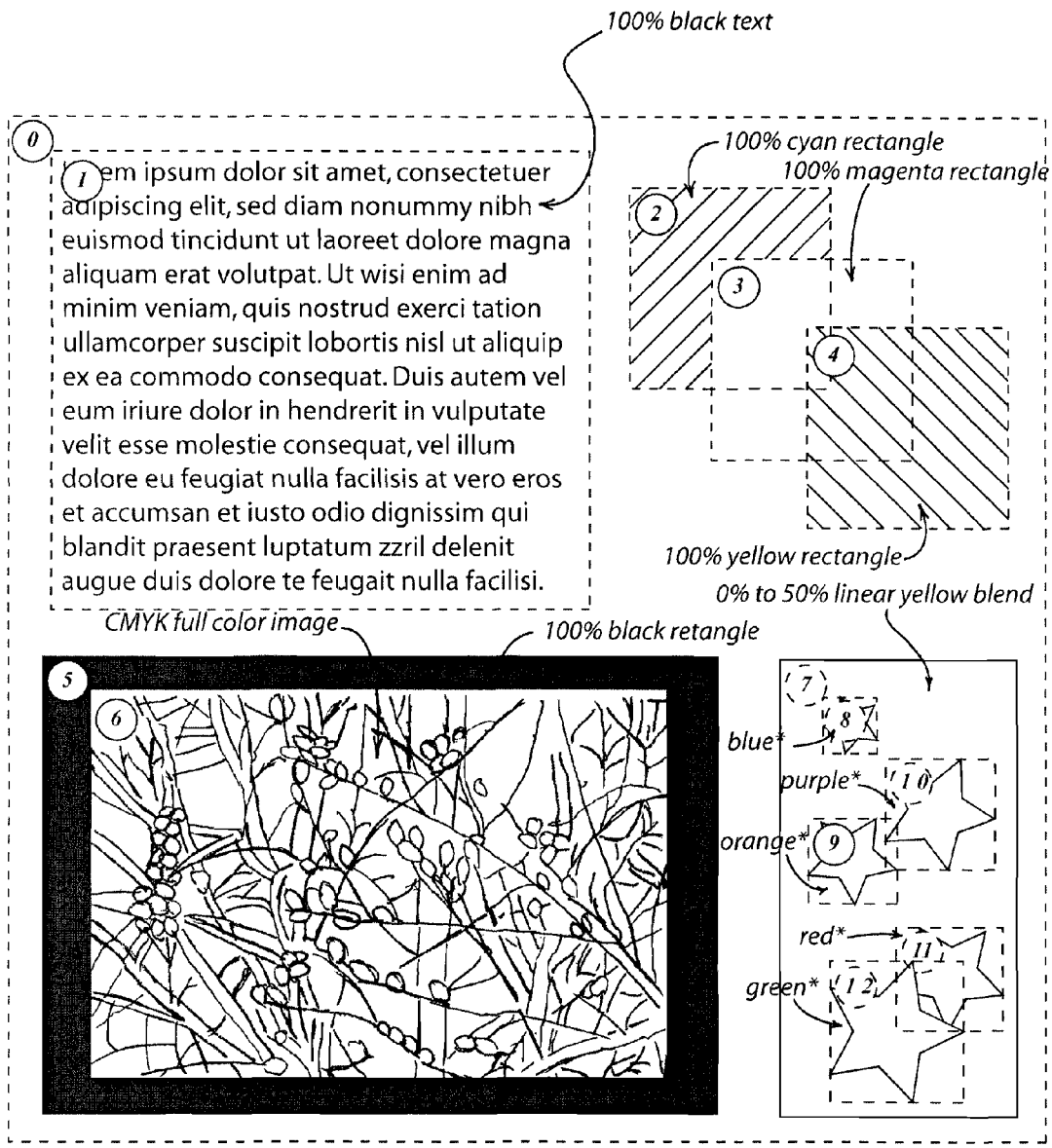
FIG. 1 is a sample page of objects showing various relationships between shapes and their bounding boxes.

If trapping is enabled, the trapping engine loops over the display list, calculating the optimum grouping of objects in the display list and generating a new list of objects, referred to as trapping objects. The list of trapping objects, like the display list, is maintained in temporal order, but a single trapping object can represent many display list objects. In other words, display list objects can be coalesced into a single object for the purposes of trapping. To facilitate the object grouping, for each object the trapping engine considers a minimum rectangular area that contains the object; this area is called a bounding box. FIG. 1 also illustrates the bounding boxes for the objects on the page. For objects 2, 3, 4, 5, 6 and 7 the bounding boxes coincide with the perimeters of the objects. For objects 8, 9, 10, 11, and 12, the bounding boxes are indicated with dashed lines. The text is grouped together as object 1 and the bounding box is indicated with dashed lines.

Grouping the objects on the display list into trapping objects is based on a set of rules. For example, two objects may be grouped into a trapping object if they have the same color, are consecutive on the display list, and have sufficiently close bounding boxes. With reference to the example illustrated in FIG. 1, only the text objects are grouped. The other objects are not grouped because of their variation in colors and intersections. Further constraints are placed on character objects. For example, character objects must also share the same size, rotation, shear and so on to be allowed to be grouped. It should be understood that the rules for grouping objects may be varied or the use of grouping may be omitted without material impact on the invention.

The bounding boxes can be calculated quickly in all cases without rendering the object shape into raster form. This is a feature of the display list in the host RIP—the display list contains information (e.g. shape, size, color, or position) of the objects in order to efficiently rasterize them to the final output device.

The trapping engine specifies trapping zones, which are areas of the page that are analyzed for trapping needs. The zones may be based on parameters specified by the user. For example, if one set of parameters applies to the entire page, the entire page is one zone. If the user specifies certain parameters for one area and other parameters for another area, the page may be considered two zones. (Trapping zones are further described in Section 6.3.2 of the PostScript Manual.) It should be understood that the parameters for zones may vary or the use of zones may be omitted without material impact on the invention.

The trapping engine processes each trapping zone defined on the page. For each zone, it iterates over every trapping object on the page to determine whether trapping is required. The trapping engine considers the position or intersection of each trapping object with respect to the preceding trapping objects in reverse temporal order, if any, i.e., the trapping objects that have a lower index on the z-axis. Thus the trapping process is performed with respect to pairs of trapping objects.

Figure 2:
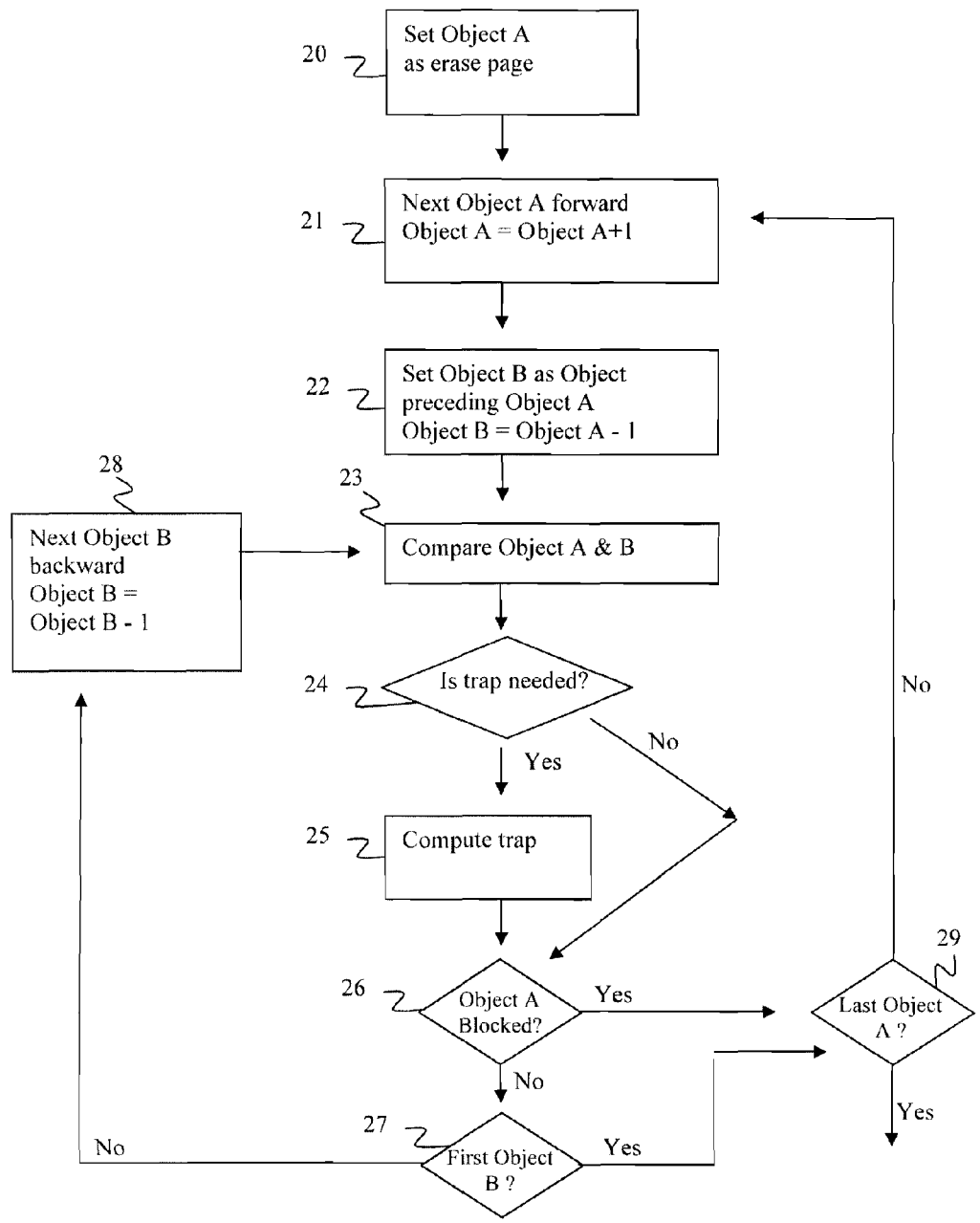
FIG. 2 is a flow chart for the trapping process of the preferred embodiment.

As illustrated in FIG. 2, the objects in the pair are arbitrarily referred to here as object A (subject object) and object B (background object relative to the subject object). At step 20, the object A is set to the erase page. At step 21, the outer loop begins by incrementing the object A to the next object forward in temporal order, i.e., expressed mathematically as object A=object A+1. At step 22 the inner loop begins by setting the object B to the object preceding the current object A, expressed mathematically as object B=object A−1. At step 23, the trapping engine compares the boundarys, bounding boxes or positions, etc. of object A and object B. At step 24, the trapping engine determines whether a trap is needed. If a trap is needed, at step 25, the trap is computed. Steps 23, 24 and 25 are described in more detail below, in part with reference to FIGS. 6 and 7.

At step 26, the trap engine also determines whether the current object A in the outer loop has been trapped such that no further trapping is necessary for that object—the whole outline of the object has been accounted for—referred to as a "complete trap." If the outline of object A is not completely accounted for (i.e., there is no complete trap for object A) then at step 27, the trapping engine determines whether object B is the first object in the page or the erase page (index 0). If there is another object that precedes object B in the page (and object A does not have a complete trap), then at step 28, the trapping engine considers the next object in reverse temporal order, (the next object backward) expressed mathematically as object B=object B−1 and processing continues with step 23. If, however, there is a complete trap for object A or if there is no object preceding object B, then at step 29, the trapping engine determines whether object A is the last object in temporal order (i.e., highest index number). If so, then the loop processing is complete, otherwise processing continues with step 21.

As applied to the example illustrated in FIG. 1, the objects are compared in pairs, with the following outcomes:

| | | |
|---|---|---|
| Object #0: erase-page | | |
| Object #1: character | Compare Objects 1 and 0 | Outcome: no need for a trap |
| Object #2: rectangle | Compare Objects 2 and 0 | Outcome: no need for a trap |
| Object #3: rectangle | Compare Objects 3 and 2 | Outcome: a trap |
| | Compare Objects 3 and 0 | Outcome: no need for a trap |
| Object #4: rectangle | Compare Objects 4 and 3 | Outcome: a trap |
| | Compare Objects 4 and 2 | Outcome: no shape intersection |
| | Compare Objects 4 and 0 | Outcome: no need for a trap |
| Object #5: fill | Compare Objects 5 and 0 | Outcome: no need for a trap |
| Object #6: image | Compare Objects 6 and 5 | Outcome: complete trap |
| Object #7: rectangle | Compare Objects 7 and 0 | Outcome: complete trap |
| Object #8: fill | Compare Objects 8 and 7 | Outcome: complete trap |
| Object #9: fill | Compare Objects 9 and 7 | Outcome: complete trap |
| Object #10: fill | Compare Objects 10 and 9 | Outcome: no shape intersection |
| | Compare Objects 10 and 7 | Outcome: complete trap |
| Object #11: fill | Compare Objects 11 and 7 | Outcome: complete trap |
| Object #12: fill | Compare Objects 12 and 11 | Outcome: a trap |
| | Compare Objects 12 and 7 | Outcome: complete trap |

The comparison of objects 5 and 6 produces a complete trap because the image (object 6) traps to the black rectangle (object 5) all the way along its boundary, and so the engine does not need to consider it against object 0.

The comparison of objects 9 and 10 shows that the bounding boxes intersect but the shapes do not intersect. Once the engine renders the two shapes and realizes that they do not intersect, it stops processing the pair and moves on to the next pair of objects.

The text or characters in object 1 gives rise to a great number of RLE spans when rendered, but none of them need to be considered for trapping because the bounding box tests show that no trapping will be required.

Figure 6:
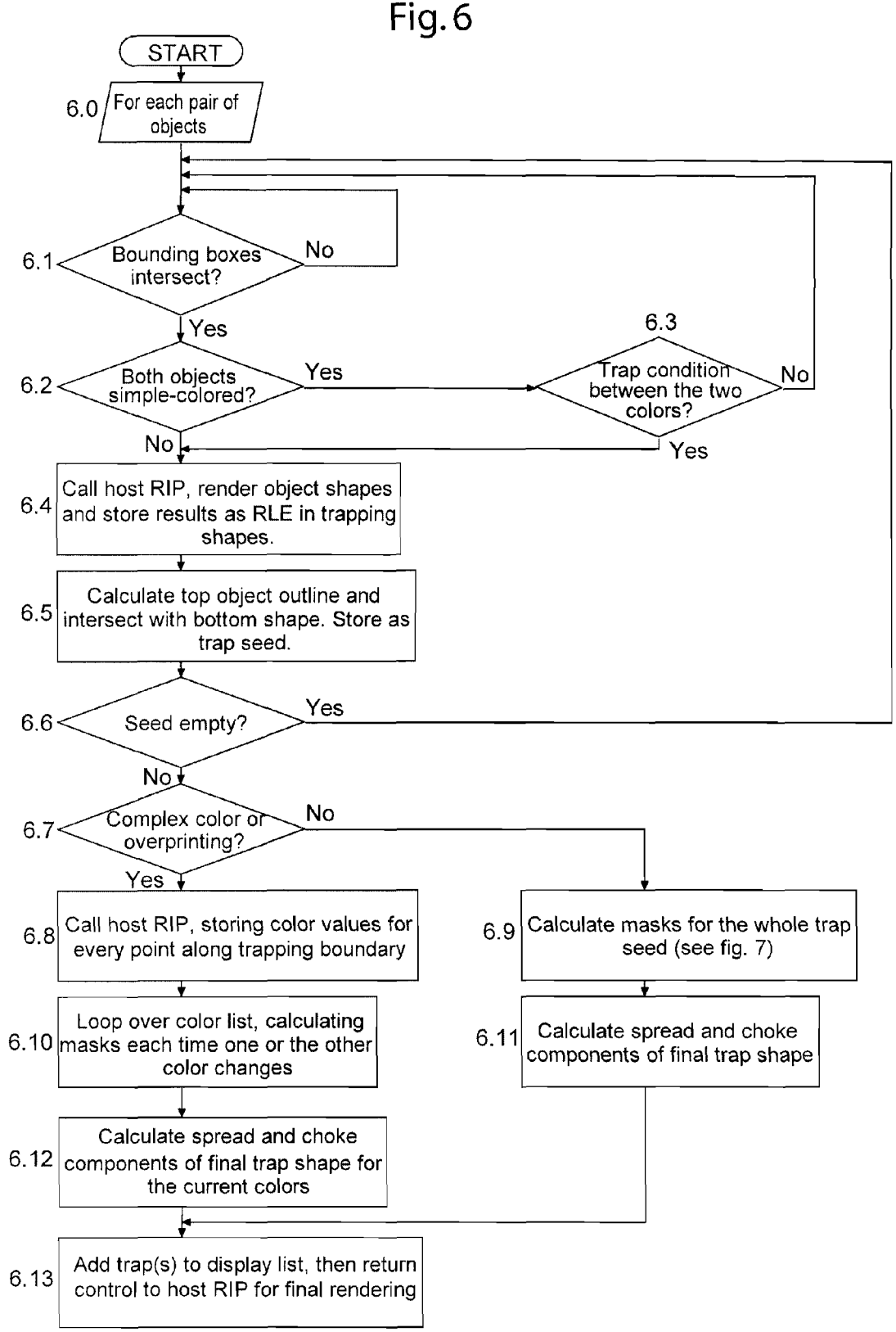
FIG. 6 shows a flow chart for further steps in the trapping process according to the preferred embodiment of the invention.

The steps of comparing and determining operate on the pairs of objects (object A and object B), as outlined in FIG. 6. At step 6.1, the trapping engine determines whether there is an intersection of the bounding boxes for the two objects. If the boxes do not intersect, then by definition there can be no intersection between the objects and hence no trap is necessary. For example objects 8 and 9 illustrated in FIG. 1 do not intersect.

At step 6.2, if the bounding boxes intersect, for example object pairs 2-3, 3-4, 5-6, and 7-8, as illustrated in FIG. 1, the engine considers whether the colors of the objects in the pair are simple or complex. Simple-colored objects are those which have a single color representative of the whole object. These include erase, character, rectangle, and fill and image-mask objects. Complex-colored objects are those which do not have a single representative color. These include image, vignette and shaded fill objects and objects with pattern fills. Some assumptions about the colors of marks on the page arising from such objects can be made: for instance the colorant planes involved in an image are known ahead of time.

At step 6.3, if both objects in the current pair are simple-colored, a trapping decision is made based on their respective color values. If the trapping rules dictate that no trap is necessary, no further work is needed for this pair. "Trapping rules" refers to any rules that decide, typically based on the colors of the objects, whether a trap should be applied. For example the trapping rules may be used to determine whether there is a significant difference in color values and set the color for the trap as a mixture for the two colors when the difference is significant. In this example, if the objects are cyan and white, the color difference is not significant and no trap would be required. However, if the objects are cyan and magenta, the color difference is significant and the color of the trap would be set to a mixture of these two colors.

When a trap is required, the trapping rules also determine the color of the trap and the size and shape of the spread and choke components of the trap. Consider two objects, A and B, that have different colors and share a boundary thus requiring a trap. With respect to object A, a spread is an extension of the color of object A into the space for object B. Again, with respect to object A, a choke is an extension of the color of object B into the space for object A. When sliding traps are employed, a trap can be 100% spread, 100% choke, or anywhere in between, depending on the relative neutral densities of the two colors. Any suitable known trapping rules may be employed. For example, a set of trapping rules are provided in section 6.3 of the PostScript Manual.

If either object is complex-colored (determined at step 6.2) or a trapping condition is indicated (determined at step 6.3), further processing on the object pair is undertaken, as follows. At step 6.4, the two objects in the pair are rendered into a Run Length Encoded (RLE) format. This is achieved by calls to the renderer of the host Raster Image Processor (RIP). The resulting rendition of pixels (e.g. RLE shapes specified by spans) that the RIP provides to the trapping engine is stored in trapping shape structures.

At step 6.5, after both objects have been calculated (rendered), an exact shared boundary detection test can be performed. This differs from a pure intersection test in that a trap may be necessary at points where the objects exactly abut, as well as those where they intersect. The pair of objects includes a top object and bottom object relative to each other according to their order on the z-axis, i.e., temporal order.

The exact shared boundary detection test proceeds by calculating the set of single pixels immediately outside the top object of the pair, referred to as the object outline. Each row of the object is considered in turn: the spans of the row are elongated by one pixel at either end, and then merged with the spans from the rows immediately above and below it. The resulting shape is then inverse-masked with the original spans for the object to define the outline. A quotient of the object thinness is calculated by dividing the area of the outline with the area of the shape—a thinner shape will have a larger thinness quotient by this measure. This value is used to constrain the size of the traps for thin objects. This prevents the trap from becoming more significant and visible than the original object.

Figure 3A:
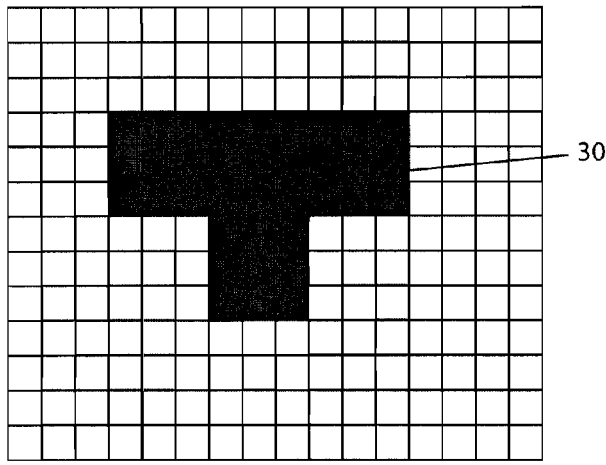
FIGS. 3A-3D show the process of the exact shared boundary detection test.
Figure 3B:
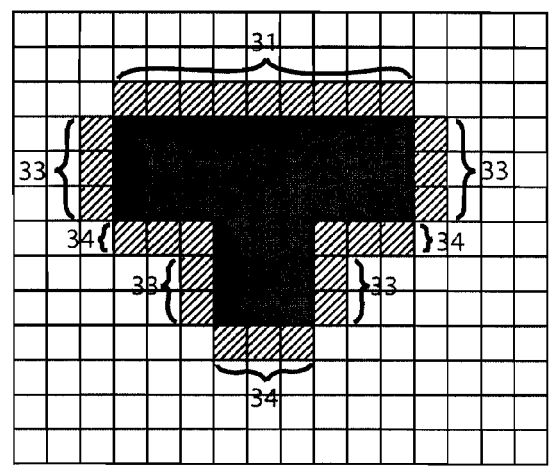
Figure 3C:
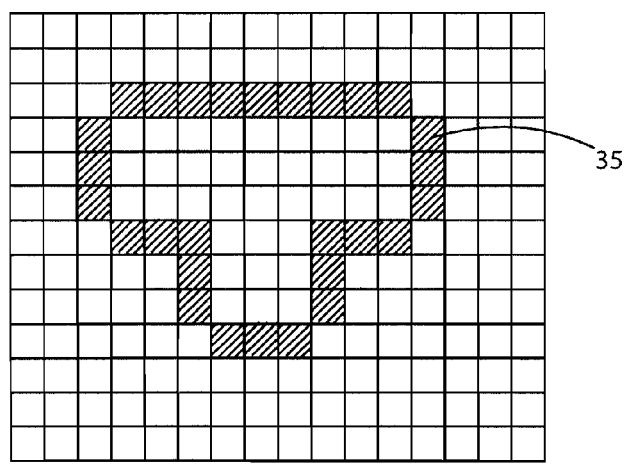

For example, as illustrated in FIGS. 3A-3B, a T-shaped object 30 is merged with the span from the row above 31 and the span from the row below 34 and the spans of the object are elongated at either end 33. The enlarged shape is inverse-masked with the object 30 to produce the outline 35, as illustrated in FIG. 3C. In this example there are 36 pixels in object 30 and 28 pixels in the outline 35. Thus the thinness quotient in this example is 28/36.

The outline of the top object is used as the starting point in calculating the trap seed. The trap seed is the set of pixels on which a trap, if generated, will be positioned, and typically centered. At step 6.5, the trapping engine masks the shape of the trap seed with the shape of the bottom object. If the resulting seed is empty, there is no trapping boundary between the two objects in the current pair, and the engine ceases processing of the pair and moves on to the next pair.

Figure 3D:
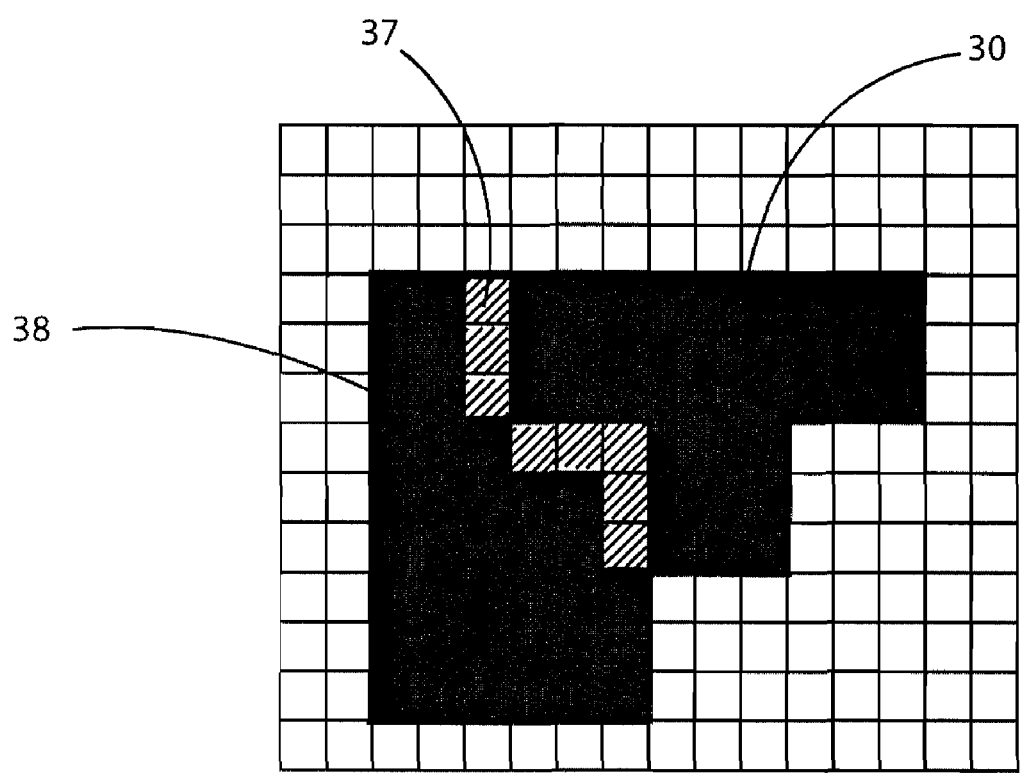
Figure 4A:
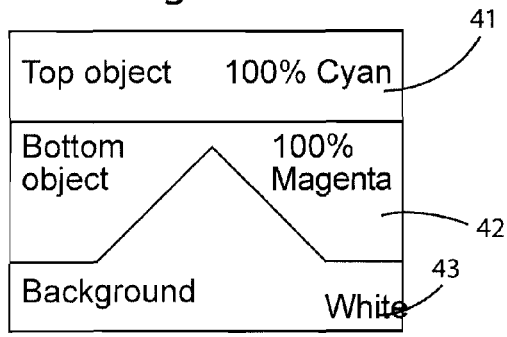
FIGS. 4A-4G show an example of a trap, positive spread mask, and negative mask.
Figure 4B:
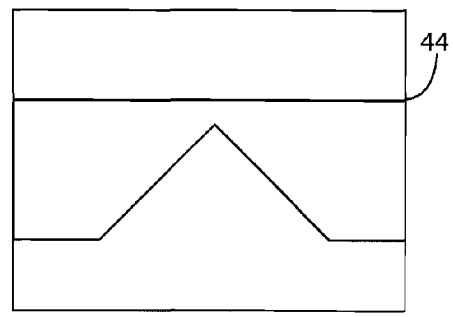
Figure 4C:
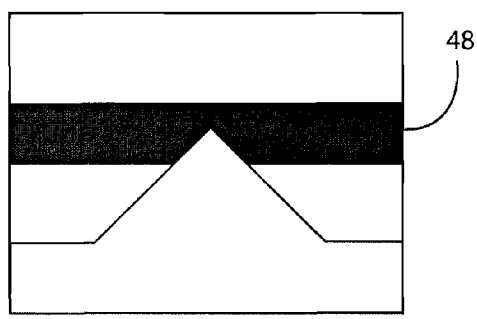
Figure 4D:
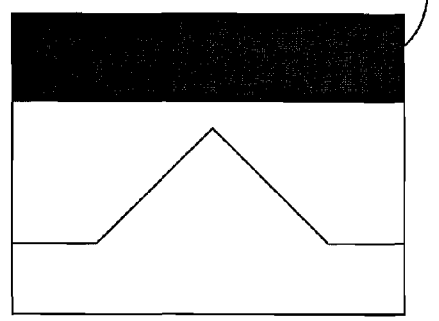
Figure 4E:
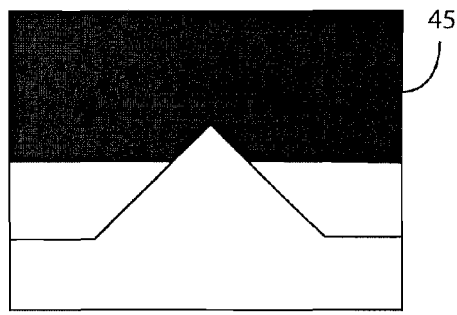
Figure 4F:
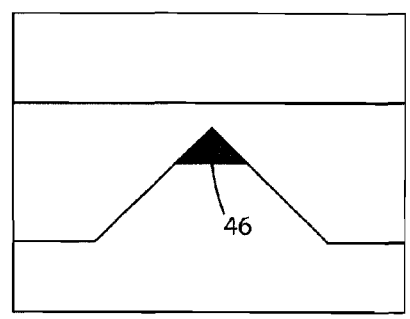
Figure 4G:
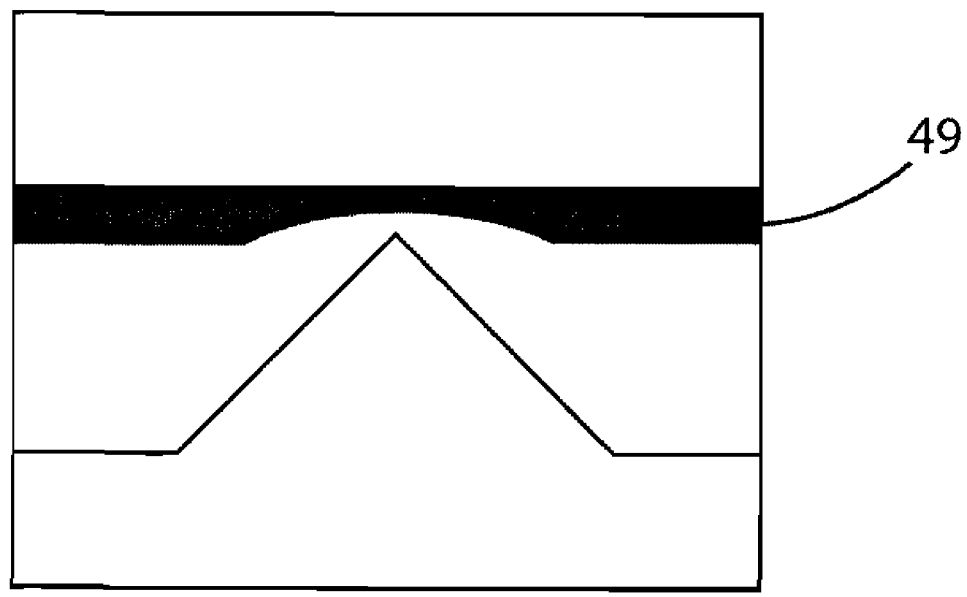

For example if magenta object 30 is the top object with respect to cyan object 38, as illustrated in FIG. 3D, the trapping engine masks the trap seed 35 (outline) with the bottom object 38. The resulting seed 37 represents the set of pixels exactly outside the top shape 30. The resulting seed may constitute half of a boundary requiring a trap; the other half being exactly one pixel inside the top shape.

The seed is now further refined by a separate looping over objects which in temporal order precede the bottom object of the current pair, calculating their shape if necessary (object shapes are cached if there is sufficient memory), and excluding pixels from the seed which lie within these shapes.

After this process is finished, the trap seed contains only those pixels, which characterize a potential trapping boundary between the two objects in the current pair. At step 6.6 (or at any time) if the seed becomes empty; processing on the current pair is halted since the potential trapping boundary has been completely obscured. If the trap seed is not empty, then a trap is computed based on the trap seed.

To compute the trap, at step 6.7, the trapping engine determines whether either object in the current pair is complex-colored.

If both objects are simple-colored, the trapping masks can now be calculated indicated at steps 6.9 and 6.11. Four masks are calculated: two for the spread and two for the choke. The positive masks define where the trap seed is permitted and the negative masks define where the trap is not permitted. The positive and negative masks are determined based on how similar the adjacent colors are. If the colors on the two sides of an object boundary (inside and outside) are similarly colored, the trap seed is permitted. If the colors are not similar, the trap seed is not permitted in that area because the trap would have a worse appearance than the absence of a trap in that area.

The trapping engine determines the area of the trap that is similar to the color of the top object of the current pair, referred to as the top mask, and determines the area of the trap that is similar to the color of the bottom object of the current pair, referred to as the bottom mask. As outlined in FIG. 7, at step 7.1 the trapping engine considers each object whose bounding box intersects with the potential trap. At step 7.2 if the color of the intersecting object is similar to the bottom object of the current pair, then at step 7.3 merge the intersecting object shape with the bottom mask and knock it out of the top mask. Otherwise, at step 7.4 if the color of the intersecting object is similar to the top object of the current pair, then at step 7.5 merge the intersecting object shape with the top mask and knock it out of the bottom mask. If the color of the intersecting object is not similar to the top or bottom objects of the current pair, then at step 7.6 knock the intersecting object shape out of both the top and bottom masks.

For example, as illustrated in FIG. 4A-4G, the pair of objects includes a cyan top object 41 and a magenta bottom object 42 on a white page 43. Consider the trap at the boundary 44 which will extend into the magenta object. The area 45 is where the trap is permitted. However, it is undesirable for the trap to extend into the white space 43. Therefore the area 46 is the negative mask where the trap is not permitted. The top mask 47 indicates the area that is a similar color to the top object and the bottom mask 48 indicates the area that is similar to the color of the bottom object. The area 48 is also the positive spread mask where the trap seed is permitted because the trap seed color is similar to the color of the bottom object 42. The area 46 is also the negative spread mask because the trap seed is not permitted in the white space. The area 49 is the resulting trap shape. Likewise, for the choke, the positive choke mask is the area where the choke is permitted to extend because the trap seed color is similar to the top object 41 and the negative choke mask is the area where the choke is not permitted because the trap seed color is dissimilar to the color of the top object 41.

If both objects in the pair are not simple colored, the trapping engine calculates the color on either side of the potential trapping boundary at each point. At step 6.8 the trapping engine calls the host RIP renderer, this time taking note of every time the color changes. The color values are stored in memory ready for use by the trap application loop.

If at least one object in a pair is complex-colored, the masks are regenerated inside the loop, every time the color on one or the other side of the trapping boundary changes. See FIG. 6, steps 6.8, 6.10, and 6.12. When masks are being generated each time around the loop (FIG. 7), the decisions are made on pixel color. When they are made once outside the loop, if the top object is complex-colored, only spans arising from the top object are merged with the top mask, and similarly if the bottom object is complex-colored, only spans arising from the bottom object are added to the bottom mask.

Once the masks are determined, trap feathering may be applied if enabled. Feathering is achieved by generating multiple traps, starting with the widest and lightest colored trap, and working towards the thinnest and darkest. Feathering is the variation of the trap intensity across its width, so that the trap fades from dark to light as it gets further away from the trapping boundary. The reason for this is to reduce the visual impact of the trap, whilst covering for the most likely amount of misregistration. That is, the more extreme the misregistration, the less coverage the trap provides. A conventional, non-feathered trap, provides 100% coverage up to the limit of its width, and then abruptly nothing.

Anamorphic trapping is where a trap is applied using an elliptical rather than circular brush. The result is that the user can control the degree of coverage for misregistration independently in the x and y axis, again allowing for less visually distracting traps whilst providing the necessary coverage.

For each section of the trapping boundary where the colors on either side are constant (the whole trapping boundary in the case where both objects are simple-colored), the final trap shape is calculated as follows: See FIG. 6.11, 6.12

Establish, via a set of rules (which are commonly used and generally established), the size of the spread and the choke component of the trap. Either can be zero, but not both. These are the Adobe rules mentioned above, defined in the PostScript Manual. It should be noted, though, that any convenient set of rules could be used.

For each of the spread and choke components, a trap brush and a mask brush is selected. Brushes represent a set of spans that approximate an ellipse of the appropriate dimensions for the size of the desired trap. The ratio of mask brush size to trap brush size is controlled by a parameter passed to the engine as an additional parameter for each trapping zone: for example a typical value is 2.0, which means the mask brush is twice the size of the corresponding trap brush.

Figure 5A:
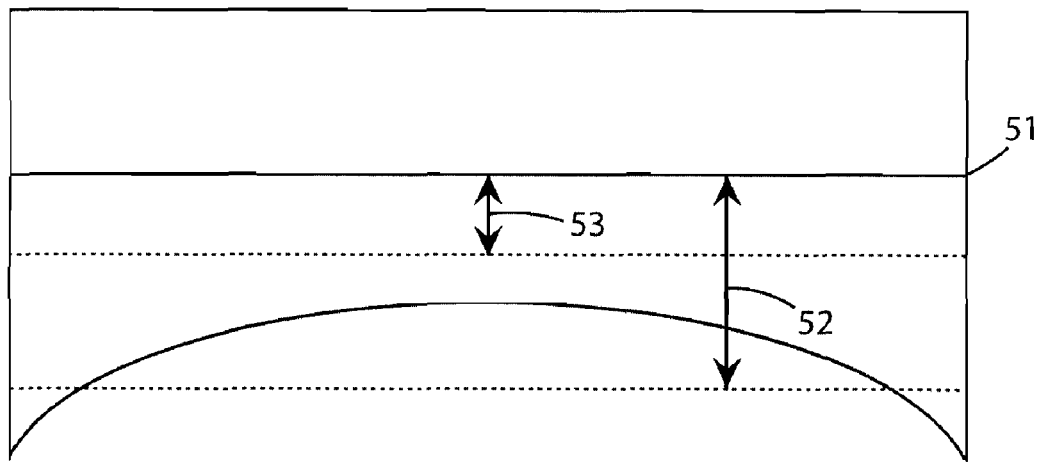
FIGS. 5A-5B show the process of brush size selection.
Figure 5B:
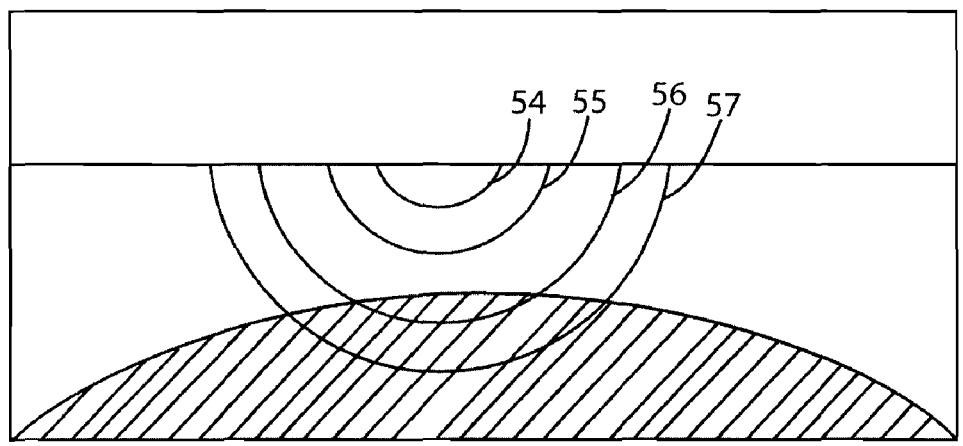

For each of the spread and choke components of the trap, for each pixel in the trap seed, the engine tests for an intersection between the mask brush and the appropriate negative mask. For example, as illustrated in FIGS. 5A-5C, the brush 57 may produce desired extent of the trap indicated 52 however it intersects the negative mask. If there is an intersection, the next smallest brush size (both mask and trap) is selected and the process repeated until there is no longer a negative mask intersection. In the example, the brush is reduced to 56, which still intersects the negative mask and then reduced to 55, which does not intersect the negative mask. The brush 55 would extend the trap approximately for the width 53. The spans from the selected trap brush are then added to the final trap shape. That way, the trap always occupies at most half (by default) of the available space. In the example the selected trap brush is 54, half of the width 55. This way the resulting trap is narrowed, proportional and mitered.

At step 6.13, the traps are added to the display list—as a new object type specifically for representing traps, and control is returned to the host RIP for rasterization of the trapped page.

As many different embodiments, variation, and modification of this invention may be made without departure from the spirit and scope thereof, it is to be understood that the invention is not limited to the specific embodiments thereof except as defined in the appended claims.

What is claimed is:

1. A method for preparing raster trapping for a page having a plurality of objects, comprising the steps of:
   (a) identifying a bounding box for each of said plurality of objects;
   (b) determining the presence of an intersection between one bounding box encompassing a subject object and another bounding box encompassing a background object that precedes the subject object in a temporal order of the plurality of objects;
   (c) determining the presence of the intersection between the subject object and the background object, in the presence of the intersection between the bounding boxes;
   (d) forming a trap based on a rendition of pixels for each of the subject object and the background object, in the presence of the intersection between the objects;
   (e) determining whether there is a complete trap for the subject object;
   (f) repeating steps (b) through (e) as applied to a next object that precedes the background object in the temporal order, treating the next object as the background object, in the absence of the complete trap; and
   (g) repeating steps (b) through (f) as applied to the next object that succeeds the subject object in the temporal order, treating the next object as the subject object, in the presence of the complete trap.

2. The method of claim 1 further comprising the step of:
   (a) rendering a shape for each of the subject object and the background object;
   (b) computing an outline for the subject object based on the shape for the subject object; and
   (c) computing the trap based on the outline for the subject object and the shape for the background object.

3. The method of claim 2 further comprising the step of positioning the trap where the outline for the subject object and the shape for the background object intersect.

4. The method of claim 2 further comprising the step of positioning the trap where the shape for the subject object and the shape for the background object share a boundary.

5. The method of claim 1 further comprising the steps of:
   (a) determining color values for the subject object and the background object based on information received from a raster image processor; and
   (b) determining whether the trap condition is present at least in part based on the color values for the subject object and the background object.

6. The method of claim 1 further comprising the steps of:
   (a) computing an outline for the subject object based on a rendition of the subject object;
   (b) computing a trapping boundary based on the outline and the rendition of the background object;
   (c) determining a plurality of pixels for the trap based on the trapping boundary;
   (d) receiving color values for the renditions of the subject object and background object;
   (e) determining the color values for the pixels of the trap based on the color values of the renditions of the subject object and background object.

7. The method of claim 6 further comprising the steps of:
   (a) enlarging the rendition of the subject object by adding one pixel around the perimeter; and
   (b) masking the enlargement with the rendition of the subject object to obtain the outline of the subject object.

8. The method of claim 6 further comprising the step of adjusting the color of the trap to gradually fade away from the trapping boundary.

9. The method of claim 6 further comprising the step of adjusting the pixels for the trap based on a ratio of an area of the outline and the area of the subject object.

10. The method of claim 6 further comprising the steps of:
    (a) determining an intersecting object in the page that intersects with the trap; and
    (b) reducing the pixels in the trap if the color values of the intersecting object are significantly different from the color values of the trap.

11. The method of claim 6 further comprising the step of generating the renditions using a raster image processor.

12. The method of claim 6 wherein the rendition comprises a plurality of pixels that are set with values according to the objects in the page.

13. A method for forming a trap while rasterizing a page having a plurality of objects, comprising:
    (a) comparing a first bounding box for a first object in the page with a second bounding box for a second object in the page to determine whether the boxes intersect;
    (b) comparing the first object with the second object to determine whether the first and second objects intersect, when the first and second bounding boxes intersect;
    (c) forming a trap seed based on a rendition of the first object and the second object, when the first and second objects intersect;
    (d) comparing the trap seed with a third bounding box for a third object in the page to determine whether the trap seed and the third bounding box intersect;
    (e) comparing the trap seed with the third object to determine whether the trap seed and the third object intersect, when the trap seed and the third bounding box intersect; and
    (f) adjusting the trap seed based on the intersection of the trap seed and the third object, when the trap seed and the third object intersect.

14. The method of claim 13 further comprising the step of identifying the third bounding box based on consideration of the plurality of objects in the page in reverse temporal order.

15. The method of claim 13, wherein an area of the trap that is similar to a color of the first object is a first mask and another area of the trap that is similar to the color of the second object is the second mask, further comprising the steps of:
   (a) adjusting the first mask of the trap when the color of the third object is similar to the color of the second object;
   (b) adjusting the second mask of the trap when the color of the third object is similar to the color of the first object; and
   (c) adjusting the first mask and the second mask of the trap when the color of the third object is not similar to the color of the first object nor the color of the second object.

16. A system for raster trapping for a page having a plurality of objects, comprising:
   (a) a raster image processor configured and arranged to render objects; and
   (b) a trapping engine configured and arranged to:
      i) determine a bounding box for each of said plurality of objects on the page,
      ii) determine whether there is an intersection between a pair of bounding boxes encompassing a subject object and a background object, wherein the subject object and the background object are selected from the plurality of objects,
      iii) if there is an intersection between the bounding boxes encompassing the subject object and the background object, request a rendering of the subject object and the background object from the raster image processor, and
      iv) based on the rendering of the subject and background objects, form a trap for the subject and background objects.

17. A system for raster trapping for a page having a plurality of objects comprising:
   a processor; and
   a memory in operative connection with the processor for storing processing instructions enabling the processor to:
   (a) identify a bounding box for each of said plurality of objects;
   (b) determine the presence of an intersection between one bounding box encompassing a subject object and another bounding box encompassing a background object that precedes the subject object in a temporal order of the plurality of objects;
   (c) determine the presence of the intersection between the subject object and the background object, in the presence of the intersection between the bounding boxes;
   (d) form a trap based on a rendition of pixels for each of the subject object and the background object, in the presence of the intersection between the objects;
   (e) determine whether there is a complete trap for the subject object;
   (f) repeat steps (b) through (e) as applied to a next object that precedes the background object in the temporal order, treating the next object as the background object, in the absence of the complete trap; and
   (g) repeat steps (b) through (f) as applied to the next object that succeeds the subject object in the temporal order, treating the next object as the subject object, in the presence of the complete trap.

18. The system of claim 16, wherein trapping engine is configured and arranged to repeat steps ii), iii), and iv) for each combination of a subject object and a background object that can be selected from the plurality of objects.

19. The system of claim 16, wherein trapping engine is configured and arranged to repeat steps ii) and iii) for each combination of a subject object and a background object that can be selected from the plurality of objects and, if there is an intersection between the bounding boxes encompassing the subject object and the background object, perform step iv) unless the subject object and background object each have a single color and trapping rules for the system indicate that no trap is needed for a combination of the colors of the subject object and background object.

* * * * *